United States Patent Office 3,247,210
Patented Apr. 19, 1966

3,247,210
TETRA AND HEXAHYDROCYCLOPENT (ij) ISOQUINOLINES
John Robert Carson, Glenside, Pa., assignor to McNeil Laboratories, Incorporated, a corporation of Pennsylvania
No Drawing. Filed Aug. 21, 1962, Ser. No. 218,459
10 Claims. (Cl. 260—286)

This invention relates to a new series of organic compounds. More particularly, it concerns components of the general formula:

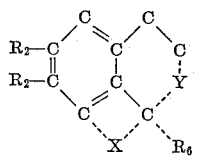

$R_2$ stands for hydrogen or lower alkoxy; Y is —$NR_1$— or =N— wherein $R_1$ is selected from the group consisting of hydrogen, acyl, lower alkyl and aralyl; and X is a member of the group consisting of

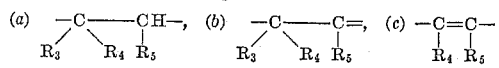

and

wherein $R_3$ and $R_4$, when taken together, represent the oxo group; $R_3$ is hydrogen, hydroxy, cyano, carboxamido, carboxyl or functionally converted carboxyl such as esterified carboxyl, e.g. $CO_2R$ where R is lower alkyl; $R_4$ is hydrogen, lower alkyl, aralkyl, aryl or heterocyclic; $R_5$ is hydrogen, lower alkyl, aralkyl, or tertiary aminomethyl; and $R_7$ is arylmethylene. $R_6$ is hydrogen or lower alkyl when Y is —$NR_1$— and X is a member of the group consisting of (a), (c) and (d).

Lower alkyl and lower alkoxy groups are those containing from 1 to 7 carbon atoms, i.e. saturated aliphatic chains, straight or branched, e.g. methyl, ethyl, propyl, isopropyl, n-butyl, isobutyl, pentyl, isopentyl, hexyl, etc., and the corresponding oxy aliphatic groups, i.e. methoxy, ethoxy, propoxy, etc., etc.

The aralkyl groups include benzyl, phenylethyl, diphenylethyl, etc. which may be further substituted by one or more halo, hydroxyl, halomethyl, nitro, amino, alkyl or alkoxy groups, or by an alkylenedioxy group, i.e. methylenedioxy. Examples of such substituents include p-chlorobenzyl; p-trifluoromethylbenzyl; p-amino-β-phenethyl; p-hydroxybenzyl; 3,4-methylenedioxybenzyl and others.

Aryl groups are substituted or unsubstituted aromatic carbocyclic radicals such as phenyl, tolyl or naphthyl, bearing such substituents as hydroxy, lower alkyl, lower alkoxy, benzyloxy, halomethyl, halo or amino. Corresponding arylmethylene groups are included within the scope of the invention.

Heterocyclic substituents are pyridyl or thienyl. The tertiary aminomethyl group is —$CH_2$—N=B where the radical —N=B represents N,N-disubstituted amino such as N,N-dilower hydrocarbon amino, the hydrocarbon radicals containing from 1 to 7 carbon atoms such as N,N-dilower alkylamino, e.g. dimethylamino, diethylamino, methylethylamino, dipropylamino or dibutylamino; N,N-dilower alkenylamino, e.g. diallylamino; or N-lower alkyl-N-lower alkenylamino, e.g. N-methyl-N-allylamino. The group —N=B aso represents an N,N-lower alkyleneamino group containing in the alkylene chain from 4 to 6 carbon atoms arranged in a carbon chain or interrupted by a hetero atom such as oxygen, sulfur or nitrogen. Radicals representing such amino groups are pyrrolidino, piperidino, hexamethyleneamino, morpholino, thiamorpholino or piperazino.

The acyl radical is the RCO— residue of an aromatic, aliphatic, heterocyclic or araliphatic carboxylic acid such as a lower aliphatic carboxylic acid, e.g. formic, acetic, propionic or butyric; a phenyl carboxylic acid, e.g. benzoic acid or an alkoxyphenyl carboxylic acid such as 4-methoxybenzoic acid; a phenyl acetic acid, e.g. p-nitrophenyl acetic acid and p-aminophenyl acetic acid, an alkoxyphenyl aliphatic carboxylic acid such as alkoxy cinnamic acid; a phenyl propionic acid such as α-hydroxyphenyl propionic acid; a monocyclic heterocyclic carboxylic acid such as furan-2-carboxylic acid; a pyridine carboxylic acid such as nicotinic or isonicotinic acid; or a thiophene carboxylic acid such as thiophene-2-carboxylic acid.

Therapeutically useful acid addition salts of the compounds of this invention include those obtainable by reacting the base with an appropriate acid as, for example, an inorganic acid such as a hydrohalic acid, i.e. hydrochloric, hydrobromic or hydriodic acid; sulfuric or nitric; a phosphoric acid; an organic acid such as acetic, propionic, glycolic, lactic, pyruvic, oxalic, malonic, succinic, maleic, fumaric, malic, tartaric, citric, benzoic, cinnamic, mandelic, methanesulfonic, ethanesulfonic, hydroxyethanesulfonic, benzenesulfonic, p-toluenesulfonic, salicylic, p-aminosalicylic, 2-phenoxybenzoic or 2-acetoxybenzoic acid.

Depending upon the conditions employed during the course of the reaction, the novel compounds are obtained either in the form of the free bases or salts thereof. The salts are converted to the free bases in the usual manner, for example by reaction with alkali such as sodium or potassium hydroxide. The bases can be converted to their therapeutically useful acid addition salts by reaction with an appropriate organic or inorganic acid.

The novel compounds may be converted into the corresponding quaternary ammonium compounds by reaction of the tertiary bases with alkylating agents, i.e. alkyl or aralkyl halides or esters formed by reacting alkanols with an oxygen-containing acid such as methyl iodide, ethyl bromide, propyl chloride; lower alkenyl halides—allyl bromide; dilower alkyl—sulfates—dimethylsulfate, diethylsulfate; lower alkylaryl sulfonates—methyl-p-toluolsulfonate or aralkyl halides—benzyl choride. The quaternizing reaction may be performed in the presence or absence of a solvent, at room temperature or under cooling, at atmospheric pressure or in a closed vessel under pressure. Suitable solvents for this purpose are ethers such as diethylether and tetrahydrofuran, hydrocarbons such as benzene and hepane, ketones such as acetone and butanone, lower alkanols such as ethanol, propanol or butanol; or organic acid amides such as formamide or dimethylformamide. When lower alkyl halogenides are used as quaternizing agents, diethylether and benzene are the preferred solvents.

The resulting quaternary ammonium compounds may be converted into the corresponding quaternary ammonium hydroxides. This may be accomplished by reaction of the quaternary ammonium halides with silver oxide, by reaction of the sulfates with barium hydroxide, by treating the quaternary salts with an anion exchanger or by electrodialysis. Quaternary ammonium salts may be prepared from the resulting base by reaction with acids such as those mentioned hereinabove for the preparation of the acid addition salts or, if desired, with a mono lower alkylsulfate such as methylsulfate or ethylsulfate. The quaternary ammonium compound may also be converted into another quaternary salt directly without conversion into the quaternary ammonium hydroxide. Thus, a quaternary ammonium iodide may be reacted with freshly prepared silver chloride to yield the quaternary ammonium chloride, or the quaternary ammonium iodide may be converted into the corresponding chloride by treatment with hydrochloric acid in anhydrous methanol.

The novel compounds of the present invention may be converted to the corresponding epoxides or N-oxides by treatment with a suitable oxidizing agent such as sodium peroxide or hydrogen peroxide; ozone; or an inorganic or organic peracid in the presence of an inert organic solvent. Peroxides which are suitable oxidizing agents for this reaction are: hydrogen peroxide, sodium peroxide and the like. Peracids which may be employed as oxidizing agents are monopersulfuric or p-toluenepersulfonic and the organic percarboxylic acids, such as peracetic, performic, perbenzoic, monoperphthalic and pertrifluoroacetic. The N-oxidizing reaction may be conveniently carried out in a diluent such as benzene, toluene, chloroform, ethylenedichloride, or an alkanol such as ethanol or methanol. The reaction reaches completion over a wide limit of time; namely, from a spontaneous completion up to a period of one week. Although temperatured uring the reaction is not critical, it should be maintained within a range which will not result in further oxidation of the molecule, room temperature being preferred and most convenient.

Depending on the starting materials used and the reaction conditions employed, the final products may contain at least one unsaturated carbon-carbon or carbon-nitrogen linkage. Hence, compounds falling under the general formula given above may be:

1,2,2a,3,4,5-hexahydrocyclopent (ij) isoquinoline

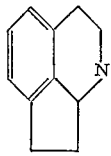

2a,3,4,5-tetrahydrocyclopent (ij) isoquinoline

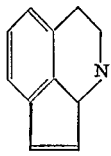

1,3,4,5-tetrahydrocyclopent (ij) isoquinoline

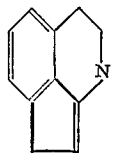

or 1,2,4,5-tetrahydrocyclopent (ij) isoquinoline

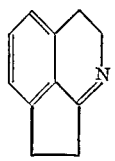

The novel compounds are useful as analgesics. This property has been demonstrated in laboratory animals by the antiwrithing test, a procedure which is shown to those skilled in the art and is accepted as a method indicative of imparted analgesic effect.

To prepare the compounds of this invention, an appropriately substituted 1,2,3,4-tetrahydroisoquinoline with an acetic group at the 1-position is reacted with a compound capable of introducing an acyl, alkyl or aralkyl group into the nitrogen, such as acyl, alkyl or aralkyl group being, for example, one of those defined hereinabove. Where the group is acyl, the acylating agent may be the corresponding acid chloride, acid anhydride or mixed acid anhydride. This reaction is carried out in a variety of nonhydroxylic solvents such as benzene, chloroform methylene chloride, tetrahydrofuran, diethylether, ethyl acetate, etc. and advantageously in the presence of an acid accepter such as a tertiary amine, e.g. pyridine, triethylamine, dimethyl aniline, diisopropylethylamine. The tertiary amine can also serve as the solvent. Alternatively, introduction of the acyl group is accomplished by reacting the appropriate tetrahydroisoquinoline with the acylating agent, i.e. acid chloride or acid anhydride, by thorough mixing in the presence of an aqueous alkali, e.g. sodium hydroxide, potassium hydroxide, sodium carbonate or potassium carbonate.

Introduction of an alkyl or aralkyl group at the nitrogen is carried out by treating the tetrahydroisoquinoline with an appropriate alkylating agent such as methyl iodide, methylsulfate, ethyl bromide, β-phenethyl bromide, phenacyl bromide, benzyl chloride, p-nitro-β-phenethyl bromide, etc. This alkylation reaction is carried out in a variety of polar or nonpolar organic solvents such as the lower alkanols, e.g. ethyl alcohol; isopropyl alcohol; ethers; esters or hydrocarbons. The alkyl or aralkyl group may also be introduced by reductive alkylation whereby the tetrahydroisoquinoline is reacted with the appropriate aldehyde or ketone in the presence of a reducing agent such as formic acid, zinc and acid or hydrogen and a catalyst. For example, methylation is conveniently carried out by heating the tetrahydroisoquinoline with a mixture of formaldehyde and formic acid.

The above-described N-substituted-6,7-dimethoxy-1,2,3,4-tetrahydroisoquinoline-1-acetic acid are useful as intermediates for the preparation of the novel cyclopent (ij) isoquinolines. Those which have an aralkyl group on the nitrogen are novel.

Cyclization of the resulting isoquinoline, substituted at the 1-position by an acetic acid group or its functional derivative such as an ester, acid chloride or nitrile, is accomplished by intramolecular condensation at an elevated temperature in the presence of a Lewis acid. Useful for this purpose are aluminum chloride, zinc chloride, phosphoric acid and polyphosphoric acid, and boron trifluoride ethyl etherate. Further, a phosphorous oxyhalide thionyl chloride or phosphorous pentoxide may be used, if a Lewis acid is present also.

Introduction of an aryl group at the 1-position of the cyclopentanoisoquinoline, accompanied by simultaneous conversion of the keto function to the alcohol, is done by reaction with a Grignard reagent, i.e. phenyl or substituted phenyl-magnesium halide, e.g. p-chloro phenyl magnesium chloride; phenyl magnesium bromide; p-tolyl magnesium chloride, ortho-tolyl magnesium bromide; or an aryl lithium compound such as phenyl lithium or ortho-tolyl lithium. The organo-metallic reaction is carried out in a variety of solvents, including by way of example, benzene, xylene, hexane, heptane, diethylether, dioxane, tetrahydrofuran or toluene.

If desired, the alcohol group may be removed by dehydration employing a suitable agent such as a mineral acid, phophorous oxychloride, phosphorous pentoxide, thionyl chloride, etc. The resulting unsaturation which may be at the 1,2; 2,2a; or 2a,3 positions may be removed by catalytic hydrogenation with a metal of the eighth group of the periodic system such as nickel, palladium, platinum, ruthenium, or rhodium, which may be supported on a carrier such as barium carbonate or charcoal. Reduction of this nature is conducted in the presence of a solvent such as an alkanol, for example, methanol or ethanol and, if so desired, under pressure.

Introduction of an aralkyl group into the 2-position of the tetrahydrocyclopent (ij) isoquinoline occurs, advantageously, when the 1-position is a keto function, by means of Claisen-Schmidt condensation with the appropriate aldehyde, resulting in 2,2a unsaturation when the 2a position is unsubstituted. If, on the other hand, $R_6$ is lower alkyl, the condensation reaction results in an arylmethylene substituent in the 2-position.

The following examples are intended to illustrate, but not to limit, the scope of the present invention.

*Example I*

A solution of 3.5 parts by weight of 6,7-dimethoxy-1,2,3,4-tetrahydroisoquinoline-1-acetic acid in 0.23 mole of formic-acetic anhydride (prepared from 10 parts by volume of 90% formic acid and 20 parts by volume of acetic anhydride) is heated under reflux for four hours. The solvent is removed and the remaining oil is dissolved in sodium bicarbonate solution and extracted with methylene chloride. The organic layer is discarded and the aqueous layer is acidified with dilute hydrochloric acid and extracted with methylene chloride. The methylene chloride solution is dried over sodium sulfate and evaporated leaving a yellow oil which crystallizes when triturated with ether. For purification, 6,7-dimethoxy-2-formyl-1,2,3,4-tetrahydroisoquinoline-1-acetic acid is recrystallized from acetone; melting point 155–156° C.

*Example II*

To 75 parts by weight of stirred polyphosphoric acid at 100° C. is added 6.3 parts by weight of 6,7-dimethoxy-2-formyl-1,2,3,4-tetrahydroisoquinoline-1-acetic acid in small portions over a period of thirty minutes. The mixture is heated for an additional thirty minutes and poured into potassium carbonate solution. The solution is extracted with methylene chloride. The methylene chloride extract is dried over sodium sulfate and evaporated to dryness. Yellow crystals (4.0 parts by weight) of 1-keto-3 - formyl-7,8-dimethoxy-1,2,2a,3,4,5-hexahydrocyclopent (ij) isoquinoline remain which are purified by recrystallization from ethyl acetate; melting point 144–145° C.

*Example III*

A solution of 4.5 parts by weight of 6,7-dimethoxy-1,2,3,4-tetrahydroisoquinoline-1-acetic acid in a mixture of 1.9 parts by volume of formic acid and 1.6 parts by weight of formaldehyde is heated on a steam bath for five hours. Concentrated hydrochloric acid (10 parts by volume) is added, and the solution is evaporated to dryness under reduced pressure. The residual 6,7-dimethoxy-2-methyl-1,2,3,4-tetrahydroisoquinoline-1-acetic acid hydrochloride is crystallized and recrystallized from glacial acetic acid; melting point 200–203° C.

*Example IV*

Polyphosphoric acid (1600 parts by weight) is heated to 100° C. and 156 parts by weight of 6,7-dimethoxy-2-methyl-1,2,3,4-tetrahydroisoquinoline-1-acetic acid hydrochloride is added to the stirred acid in small portions over a period of thirty minutes. The mixture is heated for thirty minutes more and poured into a large volume of potassium carbonate solution. The mixture is extracted with methylene chloride and the extract dried over sodium sulfate. The solvent is evaporated and a yellow solid remains. After one recrystallization from ether, the purified 2a,3,4,5-tetrahydro-7,8-dimethoxy-3-methylcyclopent (ij) isoquinolin-1(2H)-one melts at 100–102° C.

*Example V*

A solution of p-chlorophenylmagnesium bromide is prepared from 0.97 parts by weight of magnesium and 7.65 parts by weight of p-chlorobromobenzene in 20 parts by volume of ether. A solution of 5.0 parts by weight of 2a,3,4,5 - tetrahydro - 7,8 - dimethoxy-3-methylcyclopent (ij) isoquinolin-1(2H)-one in 20 parts by volume of tetrahydrofuran is added at such a rate that the solution refluxes gently. The reaction is heated under reflux for 1.5 hours after the addition is complete. It is poured into a solution of 10 parts by weight of ammonium chloride in 100 parts by volume of water. This mixture is extracted three times with methylene chloride. The combined extracts are washed with sodium carbonate solution and water and are dried over sodium sulfate. The solvent is evaporated leaving a grey solid. After recrystallization from ethanol, pure 1-p-chlorophenyl-7,8-dimethoxy-3-methyl-1,2,2a,3,4,5-hexahydrocyclopent (ij) isoquinolin-1-ol melts at 175–176° C.

*Example VI*

A solution of 10.0 parts by weight of 1-p-chlorophenyl-7,8 - dimethoxy-3-methyl-1,2,2a,3,4,5-hexahydrocyclopent (ij) isoquinolin-1-ol in 120 parts by volume of glacial acetic acid is heated under reflux overnight. The solvent is evaporated under reduced pressure and the residual oil is dissolved in ethanol. Perchloric acid (70%, 3 parts by volume) is added. A yellow solid, 1-p-chlorophenyl-7,8-dimethoxy-3-methyl-1,2,4,5-tetrahydrocyclopent (ij) isoquinolinium perchlorate, precipitates and is collected by filtration. It is recrystallized from absolute ethanol; melting point 162–163° C.

*Example VII*

A solution of 10.2 parts by weight of 1-p-chlorophenyl-7,8-dimethoxy-3-methyl-1,2,4,5-tetrahydrocyclopent (ij) isoquinolinium perchlorate in 500 parts by volume of methanol with 0.2 part by weight of platinum oxide added is hydrogenated at 50 p.s.i. for three hours at room temperature in a Parr shaker. The catalyst is filtered off and the solvent is evaporated. Sodium hydroxide solution is added to the residue and the mixture is extracted three times with ether. The ether solution is dried over magnesium sulfate and the solvent is evaporated leaving 6.5 parts by weight of a white solid. 1-p-chlorophenyl-7,8-dimethoxy-3-methyl-1,2,2a,3,4,5-hexahydrocyclopent (ij) isoquinoline is purified by recrystallization from ether-methylcyclohexane; melting point 126–127° C.

*Example VIII*

A solution of 8.1 parts by weight of 7,8-dimethoxy-3-methyl-1,2,2a,3,4,5-hexahydrocyclopent (ij) isoquinolin-1-one in 40 parts by volume of 95% ethanol is mixed with a solution of 2.3 parts by weight of sodium hydroxide in 8 parts by volume of water. To the resulting solution is added 3.96 parts by weight of freshly distilled benzaldehyde. The mixture is warmed to 40° C. and then allowed to stir at room temperature for twenty-four hours. An orange solid, 2-benzyl-4,5-dihydro-7,8-dimethoxy-3-methylcyclopent (ij) isoquinolin-1(3H)-one separates and is filtered off. It is recrystallized from absolute ethanol; melting point 182–183° C.

*Example IX*

A solution of 1.0 parts by weight of 2-benzyl-4,5-dihydro-7,8-dimethoxy-3-methylcyclopent (ij) isoquinolin-1(3H)-one in 35 parts by volume of glacial acetic acid with 0.05 part by weight of 10% palladium on carbon suspended in it is hydrogenated at atmospheric pressure. After forty-five minutes the uptake of hydrogen becomes slow and the color of the solution turns from deep orange to light yellow. The catalyst is removed by filtration and the solution is evaporated to dryness under reduced pressure. The residual oil is dissolved in the minimum amount of absolute ethanol and etherial hydrogen chloride is added. A white solid, 2-benzyl-7,8-dimethoxy-3-methyl-1,2,2a,3,4,5-hexahydrocyclopent (ij) isoquinolin-1-one, crystallizes, which after two recrystallizations from ethanol melts at 202° C. (d.).

*Example X*

A solution of 9.5 parts by weight of 7,8-dimethoxy-3-methyl-1,2,2a,3,4,5-hexahydrocyclopent (ij) isoquinolin-1-one in 40 parts by volume of 95% ethanol is mixed with a solution of 2.3 parts by weight of sodium hydroxide in 8.0 parts by volume of water. To the resulting solution is added a solution of 5.32 parts by weight of p-chlorobenzaldehyde in 20 parts by volume of 95% ethanol. The mixture is stirred for twenty-four hours at room temperature and an orange solid, 2-(p-chlorobenzyl)-4,5-dihydro-7,8-dimethoxy-3-methylcyclopent (ij) isoquinolin-1(3H)-one, separates. It is filtered off; after recrystallization from absolute ethanol it melts at 145–146° C.

*Example XI*

A solution of 4.0 parts by weight of 2-(p-chlorobenzyl)-4,5-dihydro-7,8-dimethoxy-3-methylcyclopent (ij) isoquinolin-1(3H)-one in 75 parts by volume of glacial acetic acid with 0.2 part by weight of 10% palladium on charcoal added is hydrogenated at 36 p.s.i. and room temperature for forty-five minutes. The color of the solution changes from deep orange to light yellow. The catalyst is filtered off and the solvent is removed under reduced pressure. The residual oil is dissolved in absolute ethanol and etherial hydrogen chloride is added. A white solid, 2-(p-chlorobenzyl)-7,8-dimethoxy-3-methyl-1,2,2a,3,4,5-hexahydrocyclopent (ij) isoquinolin-1-one, precipitates; melting point 208–209° C.

What is claimed is:

1. 1-keto-3-lower aliphatic acyl-7,8-dilower alkoxy-1,2,2a,3,4,5-hexahydrocyclopent (ij) isoquinoline.
2. 1-keto-3-lower alkyl-7,8-dilower alkoxy-1,2,2a,3,4,5-hexahydrocyclopent (ij) isoquinoline.
3. 1-halophenyl-3-lower alkyl-7,8-dilower alkoxy-1,2,2a,3,4,5-hexahydrocyclopent (ij) isoquinolin-1-ol.
4. 1-halophenyl-3-lower alkyl-7,8-dilower alkoxy-1,2,2a,3,4,5-hexahydrocyclopent (ij) isoquinoline.
5. 1-keto-3-formyl-7,8-dimethoxy-1,2,2a,3,4,5-hexahydrocyclopent (ij) isoquinoline.
6. 3-methyl-7,8-dimethoxy-2a,3,4,5-tetrahydrocyclopent (ij) isoquinolin-1(2H)-one.
7. 1-p-chlorophenyl-3-methyl-7,8-dimethoxy-1,2,2a,3,4,5-hexahydrocyclopent (ij) isoquinolin-1-ol.
8. 1-p-chlorophenyl-3-methyl-7,8-dimethoxy-1,2,4,5-tetrahydrocyclopent (ij) isoquinolinium perchlorate.
9. 1-p-chlorophenyl-3-methyl-7,8-dimethoxy-1,2,2a,3,4,5-hexahydrocyclopent (ij) isoquinoline.
10. A compound selected from the group consisting of

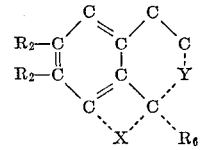

and the acid addition salts thereof, wherein:

$R_2$ is a member of the group consisting of hydrogen and lower alkoxy;

Y is a member of the group consisting of $=N-$ and $-NR_1-$, wherein $R_1$ is selected from the group consisting of hydrogen, lower alkyl and lower aliphatic acyl;

X is a member of the group consisting of (a) 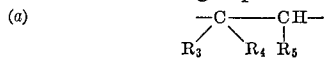

and (b) 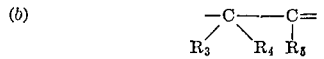

wherein $R_3$ is selected from the group consisting of hydrogen and hydroxy, $R_4$ is selected from the group consisting of hydrogen and aryl, $R_3$ and $R_4$ together being an oxo group, and $R_5$ is selected from the group consisting of hydrogen and aralkyl, said aryl and the aromatic moiety of said aralkyl being selected from the group consisting of phenyl and halophenyl; and $R_6$ is hydrogen when Y is $-NR_1-$ and X is (a).

References Cited by the Examiner

Battersby et al., J. Chem. Soc., 1960, pages 3474–82.

NICHOLAS S. RIZZO, *Primary Examiner*.

DUVAL T. McCUTCHEN, *Examiner*.